(12) United States Patent
Chen et al.

(10) Patent No.: US 8,038,117 B2
(45) Date of Patent: *Oct. 18, 2011

(54) SUPPORTING MECHANISM FOR ELECTRONIC DEVICE

(75) Inventors: Yun-Lung Chen, Taipei Hsien (TW); Hua-Tang Li, Shenzhen (CN); Jen-Chien Chiang, Taipei Hsien (TW)

(73) Assignees: Hong Fu Jin Precision Industry (WuHan) Co., Ltd., Wuhan, Hubei Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 311 days.

This patent is subject to a terminal disclaimer.

(21) Appl. No.: 12/347,313

(22) Filed: Dec. 31, 2008

(65) Prior Publication Data

US 2010/0032533 A1   Feb. 11, 2010

(30) Foreign Application Priority Data

Aug. 8, 2008   (CN) ...................... 2008 2 0301791 U

(51) Int. Cl.
*F16M 1/00*   (2006.01)

(52) U.S. Cl. ...................... 248/677; 248/188.8; 248/923

(58) Field of Classification Search .................. 248/688, 248/649, 653, 654, 627, 673, 677, 188.5, 248/188.8, 918, 923

See application file for complete search history.

(56) References Cited

U.S. PATENT DOCUMENTS

| 4,913,396 | A * | 4/1990 | Dalebout et al. | 248/649 |
| 7,467,773 | B2 * | 12/2008 | Ogawa et al. | 248/472 |
| 7,850,132 | B2 * | 12/2010 | Chen et al. | 248/188.8 |

* cited by examiner

*Primary Examiner* — Gwendolyn Baxter
(74) *Attorney, Agent, or Firm* — Altis Law Group, Inc.

(57) ABSTRACT

A supporting mechanism for an electronic device includes a connecting bracket configured to connect to the electronic device and a supporting bracket connected to the connecting bracket. The connecting bracket includes an operating member. The supporting bracket is configured to support the electronic device. The supporting bracket includes an adjustable component having a pressing portion positioned thereon. The adjustable component is capable of elongating or shortening via pressing the pressing portion by the operating member of the connecting bracket, and being unmovable via removing the operating member from the pressing portion to change a length of the supporting bracket.

18 Claims, 6 Drawing Sheets

SUPPORTING MECHANISM FOR ELECTRONIC DEVICE

BACKGROUND

1. Technical Field

The present disclosure relates to supporting mechanisms and, more particularly, to a supporting mechanism for an electronic device.

2. Description of Related Art

An electronic device such as a display is generally connected to a base via a typical supporting mechanism capable of adjusting an angle of the display. A typical supporting mechanism usually includes a locating member that requires many screws to selectively position the display. The locating member has a complex structure, which increases the cost of the supporting mechanism, and makes it difficult and time consuming to adjust the angle of the display.

What is needed, therefore, is a supporting mechanism for an electronic device capable of allowing convenient adjustment of the electronic device.

DETAILED DESCRIPTION

Figure 1:
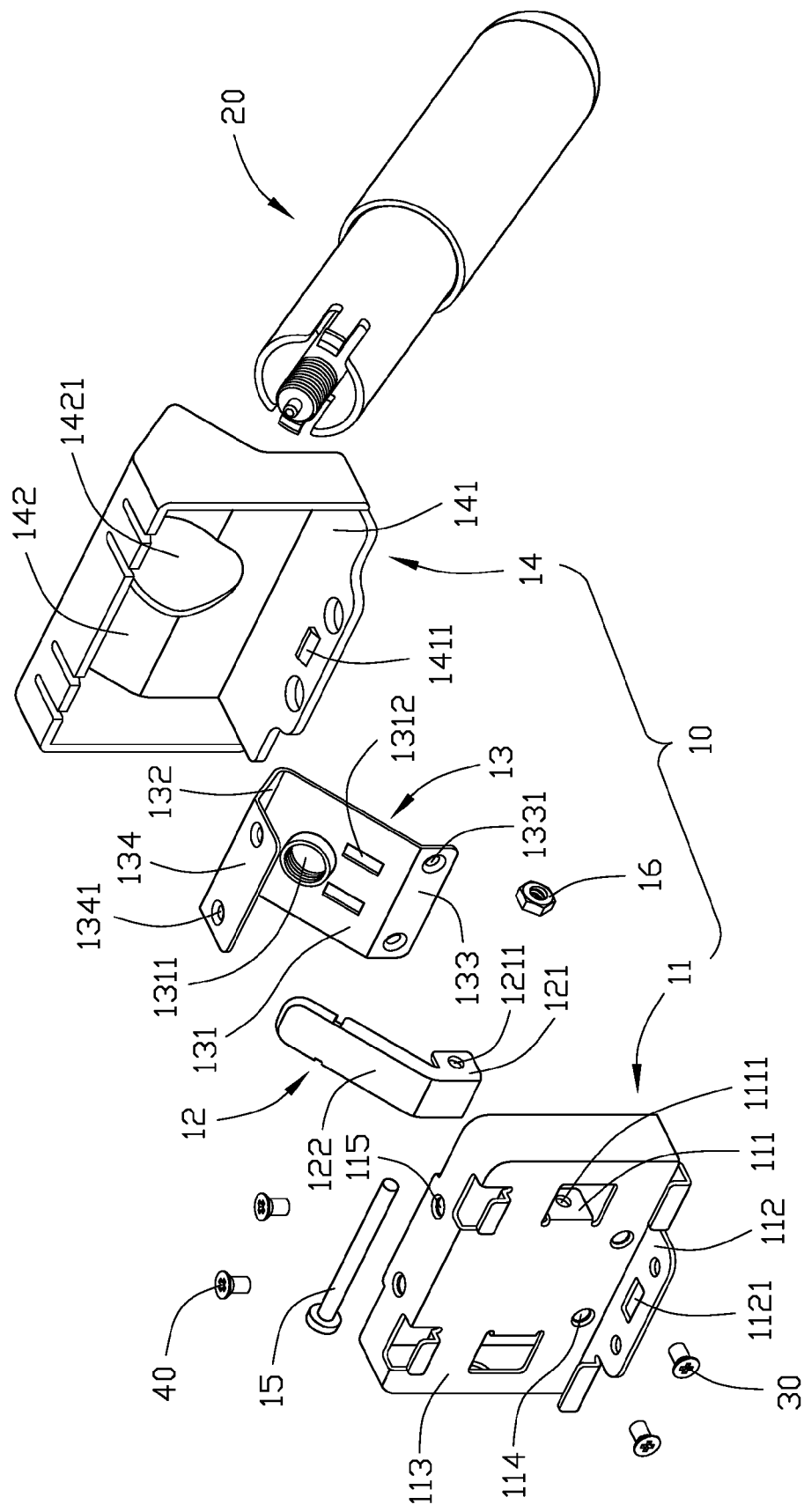
FIG. 1 is an exploded, isometric view of an embodiment of a supporting mechanism for an electronic device, the supporting mechanism includes a first connecting member, a mounting member, a second connecting member, and a supporting bracket.
Figure 2:
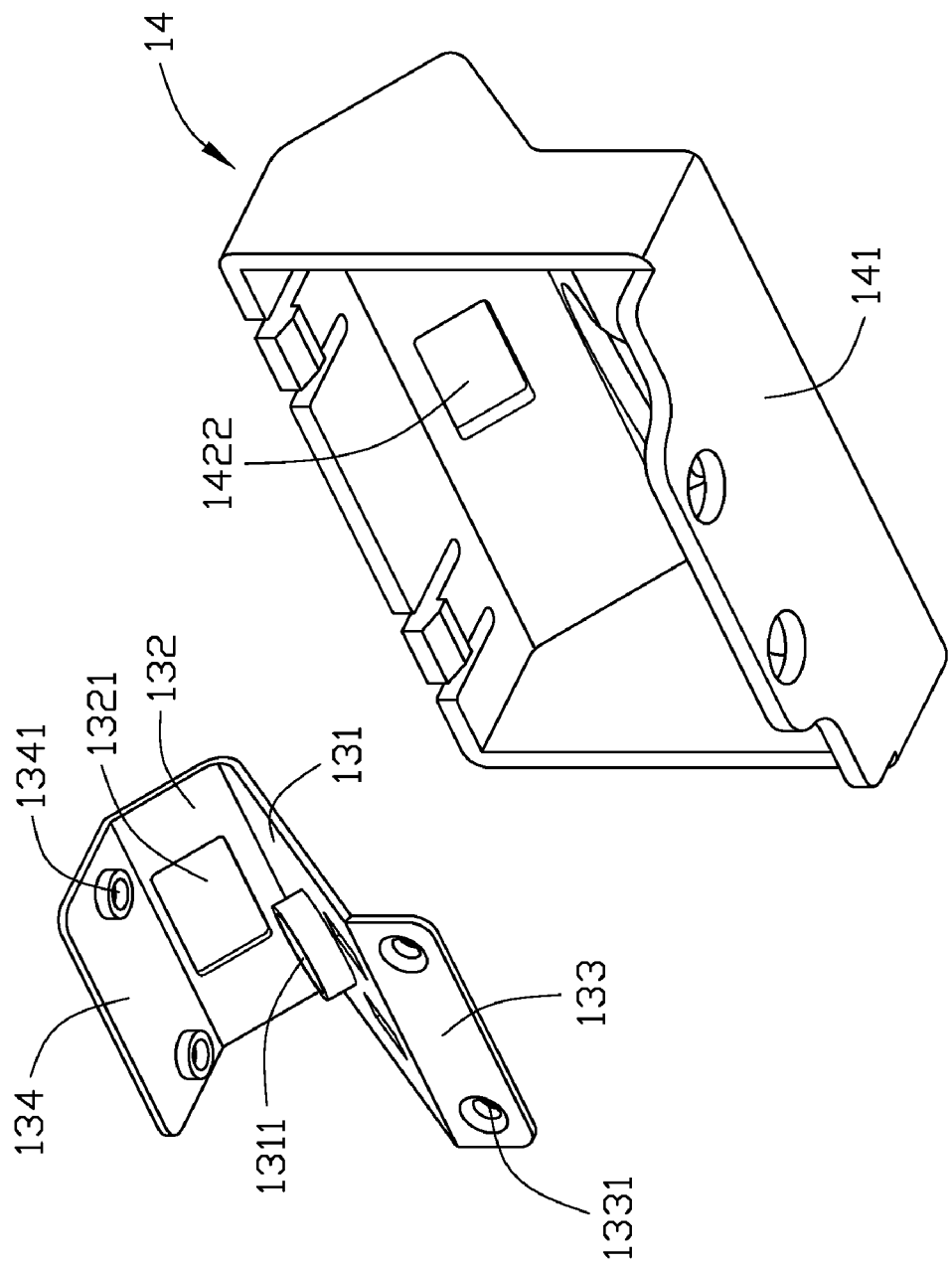
FIG. 2 is an exploded, isometric view of the mounting member and the second connecting member of FIG. 1, but viewed from another aspect.

Referring to FIGS. 1 and 2, the connecting bracket 10 includes a first connecting member 11, an operating member 12, a mounting member 13, and a second connecting member 14. The first connecting member 11 includes a side plate 113, and two bent pieces 111 extending substantially perpendicularly from the side plate 113. A pivot hole 1111 is defined in each bent piece 111. A mounting piece 112 extends substantially perpendicularly from an edge of the side plate 113. A rectangular mounting slot 1121 is defined in the mounting piece 112. Two pairs of assembly holes 114, 115 are defined in the first connecting member 11. The operating member 12 includes two opposite tabs 121 and an operating portion 122. A pivot hole 1211 is defined in each tab 121. The mounting member 13 includes a first bent portion 131, a second bent portion 132 connected to the first bent portion 131, a first fixing piece 133 extending from an edge of the first bent portion 131, and a second fixing piece 134 extending from an edge of the second bent portion 132. A screw hole 1311 is defined in the first bent portion 131, and two grooves 1312 are defined in the bent portion 131 adjacent to the screw hole 1311 for receiving the two tabs 121. A first opening 1321 is defined in the second bent portion 132 for the operating portion 122 extending through and moving therein. Two fixing holes 1331 are defined in the first fixing piece 133 corresponding to the assembly holes 114 of the first connecting member 11. Two fixing holes 1341 are defined in the second fixing piece 134 corresponding to the assembly holes 115 of the first connecting member 11. The second connecting member 14 includes a bottom wall 141, and a bent sidewall 142 extending substantially perpendicularly from an edge of the bottom wall 141. A receiving space (not labeled) is formed in the second connecting member 14 adjacent to the sidewall 142 for receiving the first connecting member 11. A positioning block 1411 protrudes from the bottom wall 141 for engaging in the mounting slot 1121 of the first connecting member 11. A receiving hole 1421 is defined in the sidewall 142 for securing the supporting bracket 20. A second opening 1422 is defined in the sidewall 142 corresponding to the first opening 1321 of the second bent portion 132.

Figure 3:
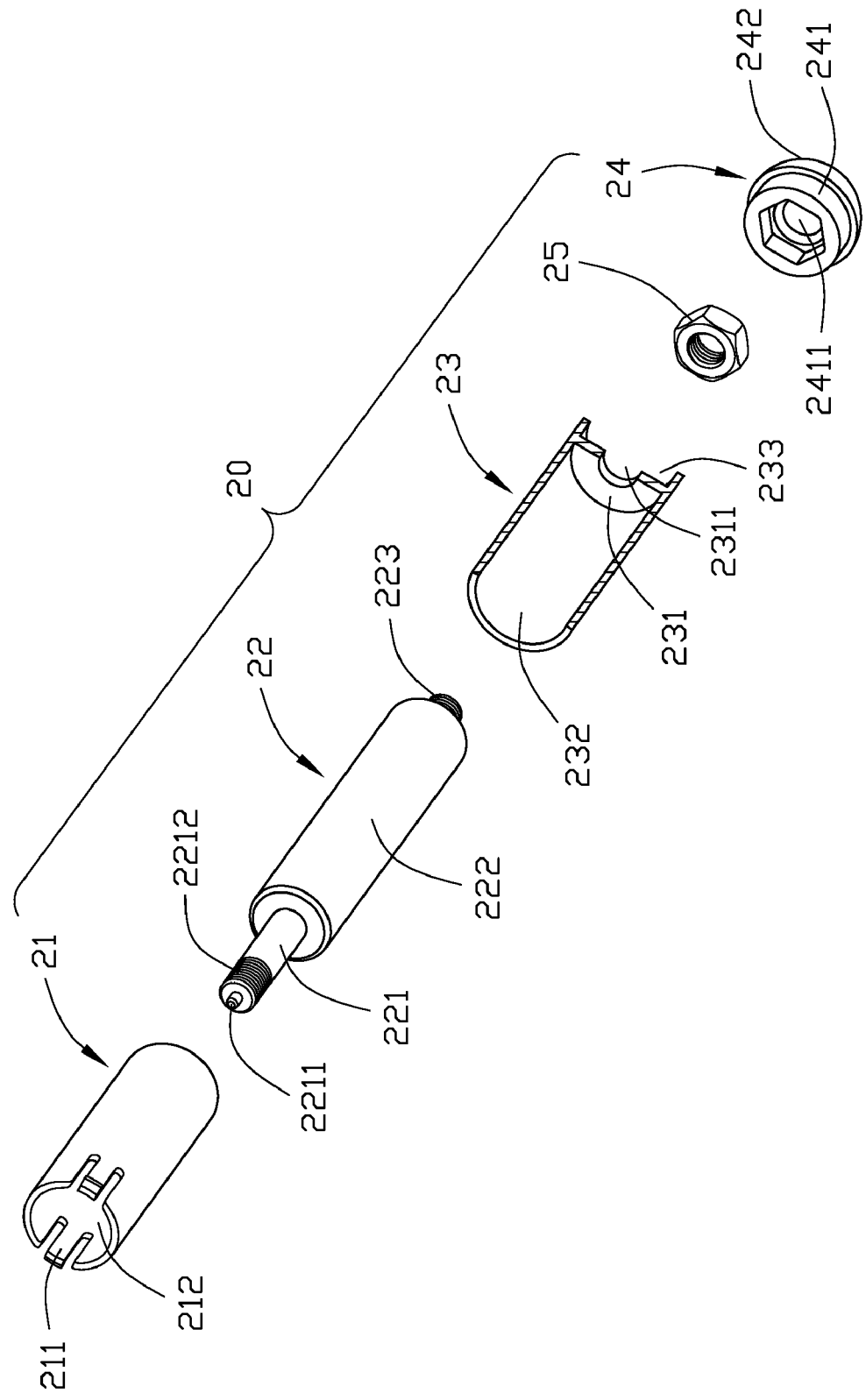
FIG. 3 is an exploded, isometric view of the supporting bracket of FIG. 1.
Figure 4:
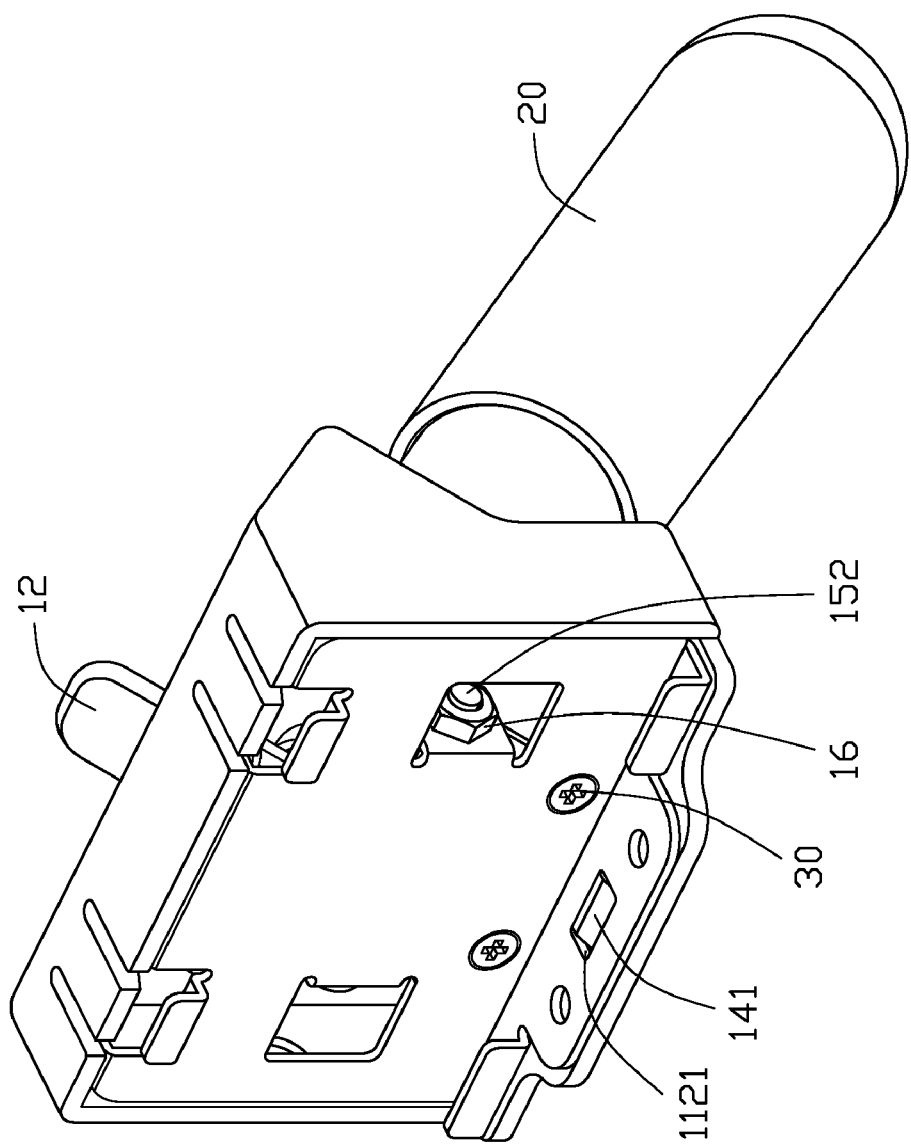
FIG. 4 is an assembled, isometric view of the supporting mechanism of FIG. 1.

Referring to FIG. 3, the supporting bracket 20 includes a first enclosure 21 secured on the second connecting member 14, an adjustable component 22, a second enclosure 23, and a supporting member 24. In the illustrated embodiment, the adjustable component 22 is a gas spring. The gas spring uses a compressed gas contained in a cylinder, and is variably compressed by a piston, to exert a force.

The first enclosure 21 includes two opposite resilient hooks 211, and an accommodating space 212 formed in the first enclosure 21 for accommodating the adjustable component 22. The adjustable component 22 includes a substantially cylindrical body 222 containing a compressed gas therein and a shaft 221 connected to one side of the substantially cylindrical body 222. A screw portion 223 is formed on the other side of the substantially cylindrical body 222. A threaded portion 2212 is formed on one side of the shaft 221 corresponding to the screw hole 1311 of the mounting member 13. A pressing portion 2211 is positioned on one end of the shaft 221. When the pressing portion 2211 is pressed, the shaft 221 will move relative to the substantially cylindrical body 222 and compress the gas in the substantially cylindrical body 222 to change a length of the adjustable component 22. When the pressing portion 2211 is released, the shaft 221 will unmovable relative to the substantially cylindrical body 222. The second enclosure 23 includes a stopper portion 231, and a first receiving portion 232 and a second receiving portion 233 are respectively formed at two sides of the stopper portion 231. The first receiving portion 232 is capable of receiving the adjustable component 22 and the first enclosure 21, and the second receiving portion 233 is capable of receiving the supporting member 24. A through hole 2311 is defined in the stopper portion 231 corresponding to the screw portion 223 of the adjustable component 22. The screw portion 223 engages in a nut 25 through the through hole 2311 to secure the adjustable component 22 in the second enclosure 23. The supporting member 24 includes an inserting portion 241 and a supporting portion 242. A notch 2411 is defined in the inserting portion 241 for receiving the nut 25.

Referring to FIGS. 1 to 4, the screw portion 223 of the adjustable component 22 passes through the first receiving portion 232 and the through hole 2311 of the second enclosure 23. The nut 25 is placed in the second receiving portion 233 and screwed on the screw portion 223, thereby securing the adjustable component 22 in the second enclosure 23. The inserting portion 241 of the supporting member 24 is inserted in the second receiving portion 233, and the nut 25 is located in the notch 2411 of the inserting portion 241. The first enclosure 21 is placed around the adjustable component 22, and sandwiched between the adjustable component 22 and the second enclosure 23. Thus, assembly of the supporting bracket 20 is completed.

The pivot holes 1211 of the tab 121 of the operating member 12 are aligned with the corresponding pivot holes 1111 of the first connecting member 11. A screw pole 15 passes through the pivot holes 1211, 1111, and a nut 16 engages with the screw pole 15 to pivotally secure the operating member 12 on the first connecting member 11. The mounting member 13 is pushed toward the operating portion 122 of the operating member 12, and the operating portion 122 passes through the first opening 1321 of the mounting member 13. The fixing holes 1331 of the first fixing piece 133 and the fixing holes 1341 of the second fixing piece 134 are correspondingly aligned with the two pairs of assembly holes 114, 115, and the screws 30, 40 are correspondingly screwed into the assembly holes 114, 115 and the fixing holes 1311, 1341, thereby securing the mounting member 13 on the first connecting member 11. The first connecting member 11 is pushed toward the receiving space of the second connecting member 14. The operating portion 122 passes through the second opening 1422 of the second connecting member 14, and the positioning block 1411 engages in the mounting slot 1121 of the first connecting member 11. Thus, assembly of the connecting bracket 10 is completed.

The supporting bracket 20 is pushed toward the second connecting member 14 and rotated to align the threaded portion 2212 thereof with and engage in the screw hole 1311 of the mounting member 13. When the two resilient hooks 211 abut on two opposite edges of the receiving hole 1421, the two resilient hooks 211 will deform elastically, and return back to their initial states until the two resilient hooks 211 are correspondingly secured on the two edges of the receiving hole 1421. Thus, assembly of the supporting mechanism is completed (see FIG. 4).

Figure 5:
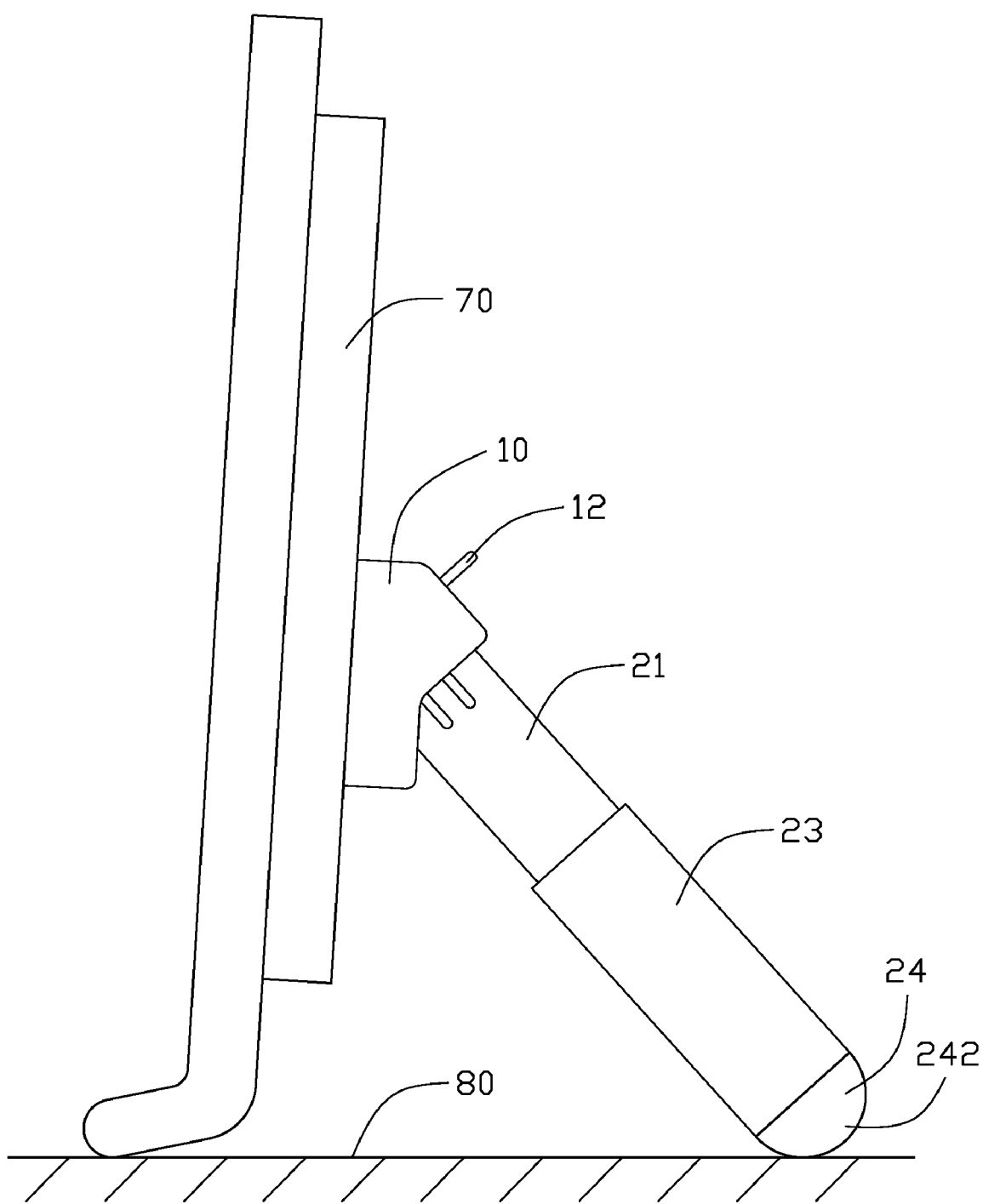
FIG. 5 is an assembled, isometric view of the supporting mechanism and a display shown in one state.
Figure 6:
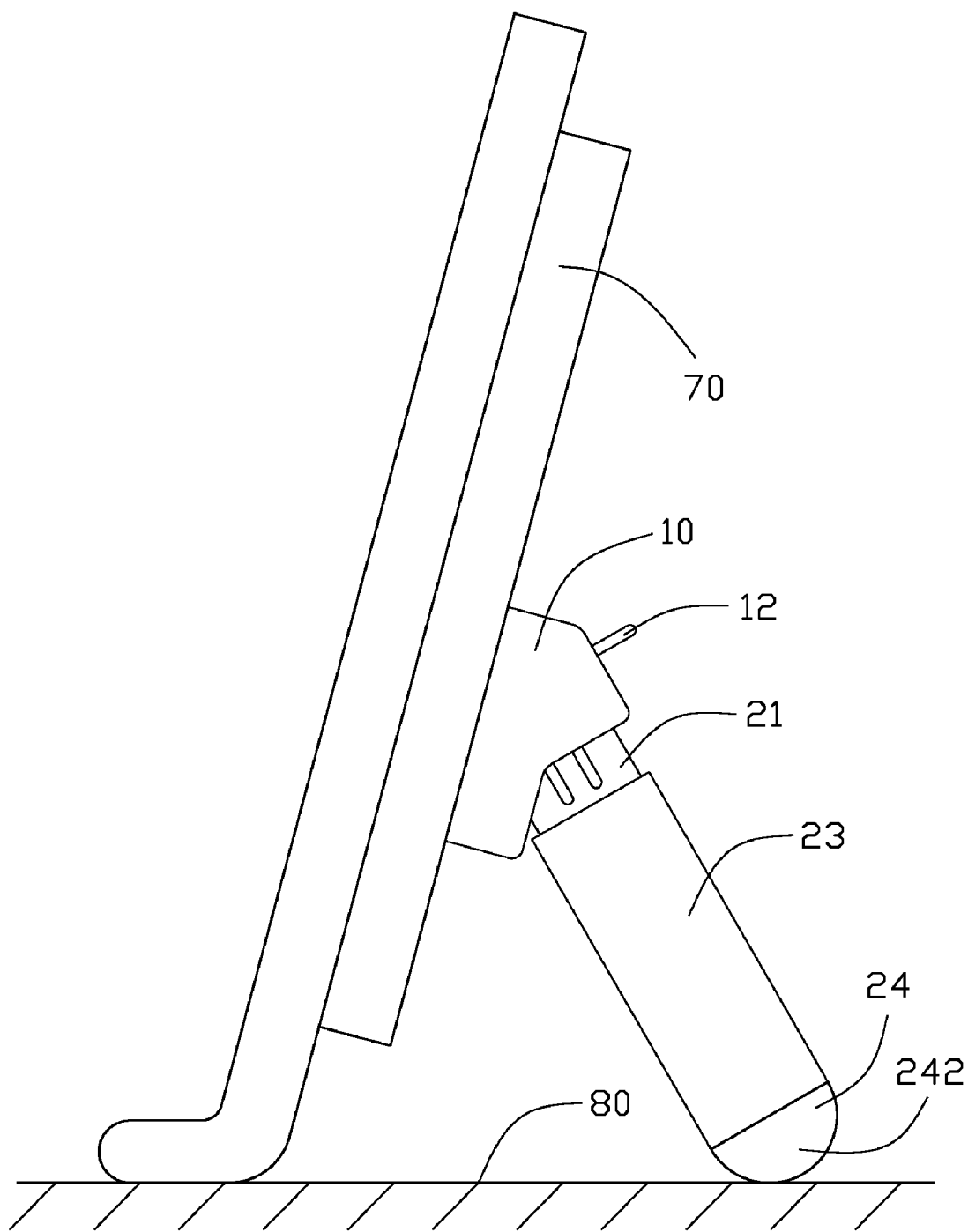
FIG. 6 is an assembled, isometric view of the supporting mechanism and the display shown in another state.

Referring to FIGS. 5 and 6, in use, the supporting mechanism is installed on the display 70, and the supporting portion 242 of the supporting bracket 20 abuts a supporting surface 80, such that the display 70 is supported on the supporting surface 80 by the supporting mechanism.

To adjust an angle of the display 70, the operating portion 122 of the connecting bracket 10 is pressed to press the pressing portion 2211 of the adjustable component 22 to adjust the length of the adjustable component 22. When the pressing portion 2211 is pressed by the operating portion 122, the gas in the cylindrical body 222 of the adjustable component 22 will be compressed, and the adjustable component 22 will be elongated or shortened to change a length of the supporting bracket 20 depending on the adjustment of the angle between the display 70 and the supporting surface 80. When the desired angle is obtained, the operating portion 122 is released from the pressing portion 2211, the adjustable component 22 will be unmovable to maintain the display 90 at the desired angle.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A supporting mechanism for an electronic device, comprising:
    a connecting bracket configured to connect to the electronic device, the connecting bracket comprising an operating member, a first connecting member and a second connecting member, an end of the operating member located between the first connecting member and the second connecting member, and the operating member extending through the second connecting member; and
    a supporting bracket connected to the connecting bracket and configured to support the electronic device, the supporting bracket comprising an adjustable component having a pressing portion positioned thereon, the adjustable component being capable of elongating or shortening via pressing the pressing portion by the operating member of the connecting bracket, and being unmovable via removing the operating member from the pressing portion to change a length of the supporting bracket.

2. The supporting mechanism of claim 1, wherein the adjustable component is a gas spring, one end of the gas spring adjacent to the pressing portion is secured on the connecting bracket.

3. The supporting mechanism of claim 2, wherein the supporting bracket comprises a first enclosure placed around the adjustable component and a second enclosure placed around the first enclosure; the first enclosure is secured on the connecting bracket, and the adjustable component is secured in the second enclosure.

4. The supporting mechanism of claim 3, wherein a screw portion is formed on the other end of the adjustable component; the second enclosure comprises a stopper portion; a through hole is defined in the stopper portion corresponding to the screw portion; the screw portion is engaged in a nut through the through hole to secure the adjustable component in the second enclosure.

5. The supporting mechanism of claim 4, wherein a first receiving portion for receiving the adjustable component and a second receiving portion are correspondingly formed between the stopper portion; the supporting bracket comprises a supporting member secured on one end of the second enclosure; the supporting member comprises an inserting portion received in the second receiving portion and a supporting portion abutting a supporting surface.

6. The supporting mechanism of claim 1, wherein the operating member is pivotally secured on the first connecting member.

7. The supporting mechanism of claim 6, wherein the connecting bracket comprises a mounting piece secured on the first connecting member, the mounting piece comprises a first bent portion for securing the adjustable component.

8. The supporting mechanism of claim 7, wherein the mounting piece comprises a second bent portion connected to the first bent portion; a first opening is defined in the second bent portion for the operating member passing through and moving therein.

9. The supporting mechanism of claim 8, wherein the second connecting member is secured on the first connecting member, a second opening is defined in the second connecting member corresponding to the first opening.

10. A supporting mechanism for an electronic device, comprising:
    a supporting bracket configured to support the electronic device, the supporting bracket comprising a gas spring configured to be elongated or shortened, thereby changing a length of the supporting bracket to adjust an angle of the electronic device; and
    a connecting bracket;
    wherein the connecting bracket comprises an operating member; the gas spring comprises a pressing portion; the pressing portion is pressed by the operating member to increase or decrease a length of the gas spring; and
    the supporting bracket comprises a first enclosure placed around the gas spring and a second enclosure placed around the first enclosure, the first enclosure is secured on the connecting bracket, and the gas spring is secured in the second enclosure.

11. The supporting mechanism of claim 10, wherein one end of the gas spring adjacent to the pressing portion is secured on the connecting bracket; a screw portion is formed on the other end of the gas spring; the second enclosure comprises a stopper portion; a through hole is defined in the stopper portion corresponding to the screw portion; the screw portion is engaged in a nut through the through hole to secure gas spring in the second enclosure.

12. The supporting mechanism of claim 11, wherein a first receiving portion for receiving the gas spring and a second receiving portion are respectively formed between the stopper portion; the supporting bracket comprises a supporting member secured on one end of the second enclosure, the supporting member comprises an inserting portion received in the second receiving portion and a supporting portion abutting a supporting surface.

13. The supporting mechanism of claim 10, wherein the connecting bracket further comprises a first connecting member; the operating member is pivotally secured on the first connecting member.

14. The supporting mechanism of claim 13, wherein the connecting bracket further comprises a mounting piece secured on the first connecting member, the mounting piece comprises a first bent portion for securing the gas spring.

15. The supporting mechanism of claim 14, wherein the mounting piece further comprises a second bent portion connected to the first bent portion; a first opening is defined in the second bent portion for the operating member passing through and moving therein.

16. The supporting mechanism of claim 15, wherein the connecting bracket further comprises a second connecting member secured on the first connecting member; a second opening is defined in the second connecting member corresponding to the first opening.

17. A supporting mechanism for an electronic device, comprising:
 a supporting bracket configured to support the electronic device, the supporting bracket comprising a gas spring configured to be elongated or shortened, thereby changing a length of the supporting bracket to adjust an angle of the electronic device; and
 a connecting bracket;
 wherein the connecting bracket further comprises a first connecting member; the operating member is pivotally secured on the first connecting member;
 the connecting bracket further comprises a mounting piece secured on the first connecting member, the mounting piece comprises a first bent portion for securing the gas spring; and
 the mounting piece further comprises a second bent portion connected to the first bent portion;
 a first opening is defined in the second bent portion for the operating member passing through and moving therein.

18. The supporting mechanism of claim 17, wherein the connecting bracket further comprises a second connecting member secured on the first connecting member; a second opening is defined in the second connecting member corresponding to the first opening.

* * * * *